Nov. 22, 1927. 1,650,031
G. F. NASH
COMBINATION DOLLY AND JACK
Filed Dec. 23, 1925
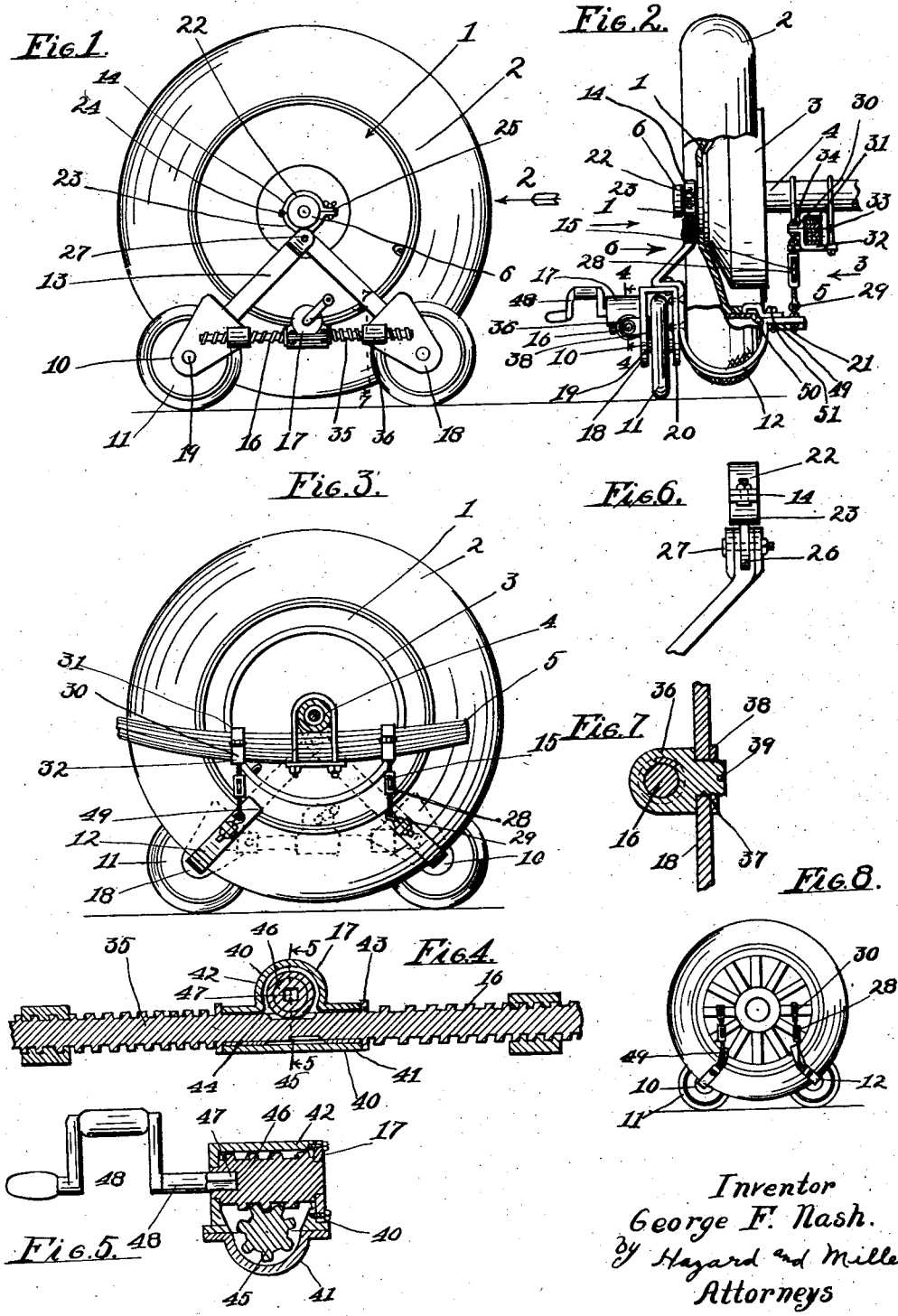
Inventor
George F. Nash.
by Hazard and Miller
Attorneys Patented Nov. 22, 1927.

1,650,031

UNITED STATES PATENT OFFICE.

GEORGE F. NASH, OF SANTA ANA, CALIFORNIA.

COMBINATION DOLLY AND JACK.

Application filed December 23, 1925. Serial No. 77,335.

My invention is a combination dolly and jack adapted to jack up a single wheel of an automobile and having wheels to carry the weight normally coming on the wheel jacked up.

An object of my invention is a combined dolly and jack adapted to engage the tire of a wheel to lift the wheel and having dolly wheels so that the automobile may be towed or driven by its own power.

A further object of my invention is a dolly and jack which may be utilized on either the front or rear wheels so that if one rear wheel is out of operation, such wheel may be jacked up and driven through the other driving wheel and also to provide a dolly and jack so that if one of the front wheels is damaged such wheel may be jacked up and the vehicle driven utilizing the small dolly wheels and allowing steering of the vehicle.

My combined dolly and jack in brief comprises a pair of small dolly wheels, brace arms connecting said wheels to an axle or axle hub, shoes connected to each of the wheels adapted to engage and support an automobile tire or rim, adjustable links adapted to engage a relatively fixed portion of the vehicle inside the wheel or to be attached to the spokes of the wheel, and an arrangement for drawing the dolly wheels to and from each other in order to jack up the damaged wheel of the vehicle.

My invention will be more readily understood from the following description and drawings, in which;

Figure 1 is an outside elevation of my combined dolly and jack, taken in the direction of the arrow 1 of Fig. 2.

Fig. 2 is an elevation in the direction of the arrow 2 of Fig. 1, parts being cut away.

Fig. 3 is an inside elevation taken in the direction of the arrow 3 of Fig. 2.

Fig. 4 is a detailed vertical longitudinal section of the jack screw taken on the line 4—4 of Fig. 2.

Fig. 5 is a vertical cross section of the jack screw on the line 5—5 of Fig. 4.

Fig. 6 is an enlarged detail of the brace arms indicated by the arrow 6 of Fig. 2.

Fig. 7 is a detail section on the line 7—7 of Fig. 1.

Fig. 8 is an inside elevation of a connection to a spoke wheel allowing free steering.

In the construction of Figs. 1, 2 and 3, an automobile wheels is designated generally by the numeral 1, being shown of the disc type with a pneumatic tire 2, a brake drum 3, an axle 4, a spring 5 attached to the axle and an axle hub 6.

The combined dolly and jack comprises a pair of dolly carriages indicated generally by the numeral 10, having small wheels 11; these carriages having shoes 12 adapted to engage a tire and brace arms 13 connected to a clamp 14 adapted to engage a fixed portion of an axle or an axle hub. Adjustable links 15 connect the inner side of the shoes to a fixed portion of the vehicle, such as the springs or the like. A jack screw 16 engages the carriages and by means of a worm drive 17 may be operated to draw the dolly carriages towards and from each other and raise and lower the wheel as hereunder explained.

Described in detail, the dolly carriages comprise a yoke 18 having an axle 19 therethrough, the brace arms 13 being secured to the inner side of the yoke by rivets 20, the shoes 12 being preferably a continuation of the brace arms as shown in Fig. 2. Brackets 21 extend lateraly inward from the end of each of the shoes.

The clamp 14 comprises an upper half 22, a lower section 23 connected by a pivot pin 24 and clamped together by a screw bolt 25, a lug 26 extending downwardly from the lower half of the clamp and swivelly connecting with the upper ends of the brace arms 13 by a pivot bolt 27 as clearly indicated in Fig. 6.

The adjustable links 15 comprise turn buckles 28 connected to an eye 29 attached to the brackets 21. The free ends of the turnbuckles are illustrated as being connected to clamps 30 adapted to fit around a spring, These clamps have upper and lower sections 31 and 32 connected by a screw bolt 33 on one side and a screw eye 34 on the turnbuckle side, the turnbuckle being connected to the eye.

The screw jack arrangement is shown particularly in Figs. 1, 4, 5 and 7 and is constructed substantially as follows:

A jack rod 35, having right and left threads on its end is threaded in swivel nuts 36 rotatably mounted on the outer face of the yoke 18; the swivel nut having a reduced cylindrical section 37, a thin clamp nut 38 on the inside and a cotter pin 39 securing the nut.

A gear housing 40 formed in a lower section 41 and an upper section 42, is clamped on the jack rod 35 between collars 43, an anti-friction bushing 44 forming a bearing surface. Worm teeth 45 are cut on the central portion of the jack rod, meshing with a transverse worm 46 journaled in the upper section of the gear housing. This worm has a squared socket 47 in which a hand wrench 48 is adapted to fit.

A clamp 49 is secured to each of the brackets 21 and is adapted to engage the inner surface of the wheel felloe as indicated by the numeral 50 in Fig. 2, a bolt 51 being utilized to secure the clamp in tight position.

If the combination dolly and jack is being secured to a rear wheel, the clamps 30 should preferably be secured to a relatively stationary part of an automobile, such as to the spring as shown in Figs. 2 and 3 and the clamp 49 may also be secured to the felloe.

If a front wheel is being jacked up on the dolly and it is desired to steer the vehicle, the clamp 49 on the felloe is sufficient to hold the jack and dolly in place. However, if a spoked wheel is being used the clamps 30 with the turnbuckle adjustable links 28 may be secured to the spokes as indicated in Fig. 8.

The manner of using my combined dolly and jack is substantially as follows:

It is first presumed that a rear or driving wheel is to be jacked up and clamped. The shoes are fitted against the wheel while it is still resting on the ground; the clamp 14 is secured to the hub and the clamps 30 to the spring, the turnbuckles being screwed sufficiently tight to hold the shoes in place; then by means of a hand wrench 48 the worm 46 is operated, thus rotating the jack rod 35 and operating the jack mechanism. This draws the nuts 36 inwardly, thus pulling the yoke with the small dolly wheels towards each other. Such action elevates the wheel above the ground, the weight coming on the dolly wheels. In this jacking operation it will probably be necessary to tighten the turnbuckles after the wheel is jacked up and in the raising operation the shoes 12 slide on the tire to a certain extent.

It will be apparent that when a driving wheel is clamped as above described and power is applied to the driving axle, that the elevated wheel remains stationary and the opposite wheel will drive through the differential. Therefore an automobile may be jacked up with my combined dolly and jack and driven under its own power to a repair station should the damage be only to the one wheel such as brakes becoming set or the like.

If it is desired to use the dolly and jack on a steering wheel such as the front wheels, if these are not provided with spokes the clamp 14 may be applied to the hub cap and if necessary the clamps 30 would be secured temporarily to part of the vehicle and the turnbuckles tightened until the wheel is jacked up to a sufficient elevation. The felloe clamps 41 would then be securely tightened so that the clamps 30 and turnbuckles may be loosened. If the wheel is of the spoke type the clamps 30 with their connecting turnbuckles may be connected to opposite spokes as indicated in Fig. 8. In this manner of jacking the front wheel the vehicle may be steered even though one front wheel is out of commission, so long as the steering mechanism is operable. If there are no sharp turns to be made the clamps 30 may be connected to a fixed part of the vehicle and the turnbuckles partially tightened; therefore any sudden jolt will not loosen the felloe clamps and still permit steering.

As there are many different types of automobile wheels and manner of mounting these on the market, it may be necessary to change the design of the various features of my combined dolly and jack to suit different types. However, such changes would be within the spirit of my invention as set forth in the description, drawings and claims.

Having described my invention, what I claim is:

1. A combined dolly and jack having shoes adapted to support an automobile wheel, carriage structures connected to said shoes, dolly wheels mounted in the carriage structures, brace arms for connecting the carriage structures to a wheel axle, a jack screw connecting the carriage structures and means to operate said screw to move the carriage structures, dolly wheels and shoes together or apart to jack up and lower an automobile wheel.

2. A combined dolly and jack as claimed in claim 1, having in addition felloe clamps operatively connected to the shoes adapted to clamp a wheel felloe.

3. A combination dolly and jack having yokes forming carriage structures, dolly wheels mounted in said yokes, curved shoes secured to said yokes, brace arms attached to said yokes, a clamp adapted to be connected to an axle cap, means to pivotally connect the brace arms to the said clamp, a jack screw operatively connected to the carriage structures, and means to operate said screw to draw the dolly wheels and shoes together to raise a wheel supported in the shoes.

4. A combination dolly and jack as claimed in claim 3 having in addition felloe clamps operatively connected to the shoes on the opposite side to the dolly wheels, adapted to clamp a wheel securely in the said shoes.

5. A combination dolly and jack as claimed in claim 3, having in addition felloe clamps operatively connected to the said shoes to engage a wheel felloe, adjustable links operatively connected to the said shoes, and means to attach said links to part of an automobile structure.

6. A combination dolly and jack having yokes forming carriage structures, dolly wheels mounted in said yokes, curved shoes secured to said yokes, brace arms attached to said yokes, a clamp adapted to be connected to an axle cap, means to pivotally connect the brace arms to the said clamp, a jack screw operatively connected to the carriage structures, means to operate said screw to draw the dolly wheels and shoes together to raise a wheel supported in the shoes, clamps adapted to be secured to a fixed part of an automobile, and turnbuckle links connecting said clamps to the said shoes.

7. A combined dolly and jack having shoes adapted to support an automobile wheel, carriage structures connected to said shoes, dolly wheels mounted in the carriage structures, brace arms for connecting the carriage structure to a wheel axle, a jack screw connecting the carriage structures, and a gear case surrounding part of the jack screw, having a gear therein meshing with the screw to operate the same whereby said screw may move the carriage structures, dolly wheels, and shoes together or apart to jack up and lower an automobile wheel.

In testimony whereof I have signed my name to this specification.

GEO. F. NASH.